(12) United States Patent
Maurer et al.

(10) Patent No.: US 7,189,794 B2
(45) Date of Patent: Mar. 13, 2007

(54) NON-PILLING POLYESTER FIBRES

(75) Inventors: Andreas Maurer, Langenneufnach (DE); Markus Höhenberger, Augsburg (DE); Roland Schreiner, Bobingen (DE)

(73) Assignee: Trevira GmbH, Frankfurt am Main (DE)

(*) Notice: Subject to any disclaimer, the term of this patent is extended or adjusted under 35 U.S.C. 154(b) by 0 days.

(21) Appl. No.: 10/481,394

(22) PCT Filed: Jun. 20, 2002

(86) PCT No.: PCT/EP02/06829

§ 371 (c)(1),
(2), (4) Date: Mar. 4, 2004

(87) PCT Pub. No.: WO03/000968

PCT Pub. Date: Jan. 3, 2003

(65) Prior Publication Data

US 2004/0143054 A1    Jul. 22, 2004

(30) Foreign Application Priority Data

Jun. 22, 2001  (DE) ............................... 101 29 688

(51) Int. Cl.
*C08G 77/04*    (2006.01)

(52) U.S. Cl. .................. 528/26; 528/499; 528/272
(58) Field of Classification Search ............ 528/26, 528/499, 272
See application file for complete search history.

(56) References Cited

U.S. PATENT DOCUMENTS

| 2,967,854 A | * | 1/1961 | Bungs ................ 528/275 |
| 3,335,211 A | | 8/1967 | Mead et al. |
| 4,483,954 A | | 11/1984 | Braus et al. |

FOREIGN PATENT DOCUMENTS

| DE | 104 089 | 2/1974 |
| DE | 24 53 201 | 5/1976 |
| DE | 24 53 231 | 5/1976 |
| DE | 41 11 066 A1 | 10/1991 |
| DE | 10129688 C1 | 1/2003 |
| FR | 1.589.057 | 4/1970 |
| JP | 50-018800 | * 2/1975 |

* cited by examiner

*Primary Examiner*—Kuo-Liang Peng
(74) *Attorney, Agent, or Firm*—Hamilton, Brook, Smith & Reynolds, P.C.

(57) ABSTRACT

The invention relates to a method for producing non-pilling polyester fibres, whereby polyethylene terephthalate is produced in the presence of organosilicon compounds of tetrahydrofurfuryl alcohol. Preferably, tetrakistetrahydrofurfuryloxysilane or tris[tetrahydrofuryloxy]methylsilane is used.

14 Claims, No Drawings

NON-PILLING POLYESTER FIBRES

RELATED APPLICATIONS

This application is the U.S. National Phase of International Application No. PCT/EP02/06829, filed Jun. 20, 2002, published in German, which application claims priority under 35 U.S.C. § 119 or 365 to German Application No. DE 101 29 688.6, filed Jun. 22, 2001. The entire teachings of the above applications are incorporated herein by reference.

This invention relates to a low pill polyester fiber based on polyethylene terephthalate and also like a process for producing it.

Pilling describes the formation of small accumulations of fibers on the surface of textile fabrics. Pills are formed when fiber ends or loose fibrous portions stick out from the surface of a textile fabric, for example of a garment, and become balled up by the abrasive stress created during wear. Owing to the high strength of polyester fibers, these balls or pills cannot drop off, but remain on the surface and make for an unsightly appearance. A physical explanation for this phenomenon is that polyester fibers have a high strength including especially a high transverse strength compared with natural fibers.

True, it is possible in principle to remove pills mechanically, for example by brushing or scraping off. This is very laborious and inconvenient and does nothing to prevent the constant re-formation of new pills.

There have already been numerous proposals to remedy this disadvantage. They have focused in particular on reducing the transverse strength of polyester fibers, although care must be taken to ensure here that the breaking strength of the fibers is not excessively reduced in order that the further processing operation may be carried out in the same way as for the normal cotton grades for example without significant damage to the fibers.

Most attempts to reduce pilling are directed to modifying the polymer, especially to lowering the average molecular weight. This can be accomplished by incorporation of cross-linkers or temporary branchers or else by modifying the polymeric structure using permanent branchers.

The principle of temporary cross-linking or branching is that the polyester chain is endowed with a thermally or hydrolytically labile bond in the polymeric chain that will, for example, hydrolytically break down when the textile sheet product or else the loose fiber is dyed after spinning.

Examples of such temporarily cross-linked polyesters are to be found for example in FR 2 290 511, where 0.01% to 2% by weight the diphenylsilanediol is introduced prior to the ester interchange reaction, based on dimethyl terephthalate (DMT). However, the breaking extensions are too high to permit processability with cotton fibers and the breaking strength is too low to weave staple fiber yarns.

A similar teaching involving temporary branchings is found in FR1 589 057, and the fibers obtained have the same disadvantages as in the aforementioned French reference.

The processes which utilize permanent branchers include production methods where a compound such as pentaerythritol is used for example. Here the intention is to exploit the effect that fibers composed of branched, stiff materials break off more readily in the ready-produced article than fibers composed of corresponding linear, flexible polymers. However, the disadvantage with such processes is that branched polymers have a lower melt viscosity than linear polymers of the same mass.

Lowering the molecular weight is not possible because of the high viscosity needed for spinning and so the effectiveness of this approach is very limited. Existing processes involving permanent branching therefore have failed to achieve the good pilling resistance results of temporary branching.

U.S. Pat. No. 3,335,211 describes a process for melt-spinning polyesters having temporary branching. The polyesters have been modified with an oxysilicon compound. This is accomplished by adding an oxysilicon compound to the polyester dope before the melt-spinning operation. It is said that an anhydrous melt forms that has a melt viscosity of about 1 000 to 6 000 poise at 275° C. The silicon compounds added have the general formulae:

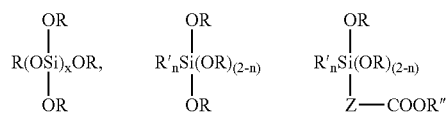

where R, R' and R" are selected from the group consisting of hydrocarbyl and oxyhydrocarbyl radicals of 1–6 carbon atoms, Z is a divalent saturated hydrocarbon group of 1–6 carbon atoms, x is a number from 1–20 and n is a number from 0–2.

The melt has to be kept anhydrous, but after the melt-spinning operation the spun fibers are exposed to moisture.

Although the $3^{rd}$ paragraph in column 8 of the above-cited U.S. patent says that the process described therein can be applied to the direct esterification of free terephthalic acid with ethylene glycol, the description part, the examples and the claims are all directed to a process which starts with an ester of terephthalic acid such as dimethyl terephthalate and then performs a customary transesterification, followed by a polycondensation.

An attempt to reproduce the teachings of U.S. Pat. No. 3,335,211 using free terephthalic acid has shown that the incorporated branching will undergo hydrolytic scission due to the water of reaction released during the polycondensation. Similarly, pronounced gelling of the polymeric material is often observed. Thus, the pure terephthalic acid (PTA) route is generally not possible under the teaching of U.S. Pat. No. 3,335,211.

Moreover, the process has a number of disadvantages and, what is more, the properties of fibers produced as per U.S. Pat. No. 3,335,211 using dimethyl terephthalate are unsatisfactory.

The findings which have been described above are confirmed by DE 41 11 066 A1. This reference suggests a direct esterification process starting from pure terephthalic acid whereby terephthalic acid and ethylene glycol are continuously esterified and then polycondensed and methoxyethyl or propyl silicate is continuously added in an amount of 300–700 ppm of silicon at a time when the prepolymer has an average molecular mass, expressed as Mw weight, between 9 000 and 16 000 and a polydispersity index between 1.5 and 2, is at a temperature between 260 and 290° C. and is under a pressure between 1.5 and 2.5 bar, the silicate/prepolymer reaction time being at least 5 minutes.

This process certainly represents an advance over the teaching of U.S. Pat. No. 3,335,211, but is very narrowly defined in that the production conditions constitute a severe restriction with regard to the process's parameters. Furthermore, the use of methoxyethyl silicate would not be generally recognized as safe, since this product, when it is used as a brancher, is scissioned during the process into 2-methoxyethanol, which is classified as teratogenic and as causing reproductive disorders. A portion of this toxic component stays unintentionally in the free or bound state in the polymer and thus also in the ready-produced fiber.

Although there are already a whole series of processes whereby low pill polyester fibers can be produced, there is still a need for improved processes and also fibers having improved pilling properties and other good properties.

It is an object of the present invention to provide a process for producing low pill polyester fibers which is suitable not only for the direct esterification and polycondensation of terephthalic acid but also for the transesterification of dimethyl terephthalate and polycondensation, which reproducibly leads to good properties, which does not prescribe narrow reaction conditions, requiring for example that the additive be added at a certain time during the production of the polyester or that there have to be certain process conditions such as the interrupting of the vacuum during the polycondensation or the observance of narrowly defined polycondensation times.

It is a further object of the present invention to provide a process which may be operated both continuously and batchwise.

These objects are achieved by a process for producing low pill polyester fibers by transesterification of at least one dialkyl dicarboxylate or esterification of at least one dicarboxylic acid with at least one diol and subsequent precondensation and polycondensation in the presence of customary catalysts and using organosilicon compounds, characterized in that the reaction mixture has added to it an organosilicon compound which has at least one substituent of the formula

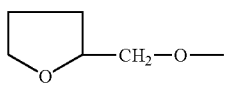

Formula I on the silicon and the polycondensate obtained is processed into fibers.

The fibers obtained are given a hydrolytic treatment either as such but preferably in a state where they have already been processed into a textile product.

The organosilicon compound used is preferably tetrakis[tetrahydrofurfuryloxy]silane.

A further advantageous organosilicon compound for the purposes of this invention is tris[tetrahydrofurfuryloxy]methylsilane.

The process of the invention is preferably operated continuously. It can with advantage also be operated batchwise.

It is preferable to use 100–2 000 ppm of the organosilicon compound, reckoned as silicon and based on the ready-produced polycondensate.

In the case of the DMT route, it is advantageous to add the organosilicon compound after the transesterification of the terephthalic ester. The preferred terephthalic ester for the purposes of this invention is dimethyl terephthalate.

It is advantageous to add the organosilicon compound at a time when the polycondensate has a molecular weight $M_w$ of 3 000–20 000 g/mol and especially 10 000–15 000 g/mol.

It is further advantageous to introduce the organosilicon compound at a time when the pressure of the polycondensation melt is 0.5 mbar-1.5 bar and preferably 10 mbar-200 mbar.

In a particularly advantageous embodiment of the process according to the invention, the organosilicon compound is added to the polycondensation melt at a time when the carboxyl group content of the polycondensate is <35 mmol/kg.

The invention further provides low pill polyester fibers obtainable by one of the processes described above. The low pill polyester fibers have an extremely low number of Si-containing particles (gels), which have an advantageous effect in relation to extrusion and processing.

To practice the process according to the invention, the polyester, polyethylene terephthalate for example, is prepared in a conventional manner.

Specifically, either dimethyl terephthalate is mixed with ethylene glycol and subjected to a transesterification, followed by a polycondensation, or free terephthalic acid is esterified directly with glycol under superatmospheric pressure. Either case leads to the formation of an oligomeric compound based on bishydroxyethyl terephthalate, and this compound is polycondensed in known manner.

The transesterification and the polycondensation may utilize customary catalysts which a person of ordinary skill in the art will know from the prior art. Preferably, however, polyethylene terephthalate is prepared by the PTA route, i.e., by reaction of free terephthalic acid with ethylene glycol, the esterification with the glycol being carried out under superatmospheric pressure. The oligomeric compound which is formed in the esterification of free terephthalic acid with glycol is then polycondensed in a conventional manner.

The polycondensation per se is carried on to a degree of polycondensation at which the polymer reaches the customary molecular weights required for the production of fibers.

The organosilicon compound of tetrahydrofurfuryl alcohol may be added according to the invention during various phases of the polyester production operation. For instance, the organosilicon compound may be added after the esterification step in the PTA route.

In the case of the DMT route, i.e., in the case of the polyester being prepared from dialkyl dicarboxylate and at least one diol, the organosilicon compounds are added after the transesterification.

It is particularly advantageous to add the organosilicon compound in the course of the polycondensation.

The organosilicon compounds which are used in accordance with the invention have at least one substituent on the silicon, in accordance with formula I. This substituent is derived from tetrahydrofurfuryl alcohol.

Organosilicon compounds are compounds which contain direct silicon-carbon compounds, but also include compounds in which the carbon is attached to the silicon via oxygen-nitrogen or sulfur atoms. Further particulars concerning organosilicon compounds are discernible for example from Romp Lexikon Chemie, $10^{th}$ completely revised edition, Georg Time Verlag Stuttgart New York, pages 4104–4106. It is essential for the purposes of the invention that at least one substituent derive from tetrahydrofurfuryl alcohol. Particularly useful organosilicon compounds derived from tetrahydrofurfuryl alcohol are compounds of the $(C_5H_9O_2)_xSi(OR')_zR_y$       Formula II where x=1, 2, 3 or 4, y=0, 1, 2 or 3, z may be from 0 to 3, subject to the proviso that x+z+y=4, and R is a linear or cyclic alkyl radical, namely methyl, ethyl, propyl, butyl or higher homologous alkyl radicals, cyclohexyl, cyclopentyl and also 2-hydroxyethyl or 2-methoxyethyl radicals or else aromatically substituents such as tolyl, phenyl, naphthyl or aryl or aralkyl groups. R' is methyl or ethyl, Z may be from 0 to 3.

The organosilicon compounds of tetrahydrofurfuryl alcohols which are preferably used have the following formula:

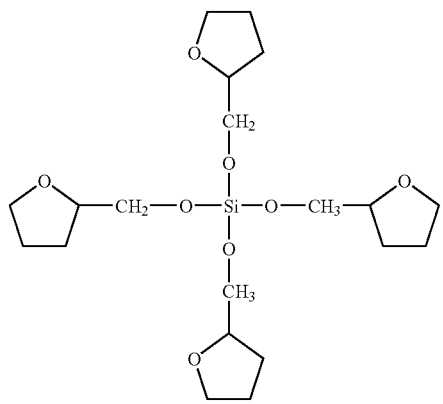

(tetrakistetrahydrofurfuryloxysilane)

Formula III

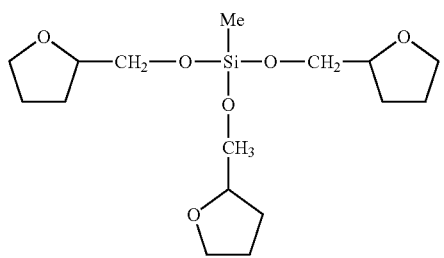

(tris[tetrahydrofurfuryloxy]methylsilane)

Formula IV

The organosilicon compounds used according to the invention may be prepared for example by transesterification of corresponding organosilanes such as for example tetraoxysilane with tetrahydrofurfuryl alcohol in the presence of catalysts such as acids for example $H_3PO_3$, metal oxides such as ZnO.

A further synthesis to prepare these organosilicon compounds consists in reacting silicon halides such as for example $SiCl_4$ with tetrahydrofurfuryl alcohol in the presence of bases, for example pyridine.

It is particularly surprising that the invention produces low pill polyester fibers in a reproducible and disruptionless manner by the PTA route in particular. Little if any troublesome gelling occurs in the process of the invention.

The organosilicon compound may advantageously be added to the polycondensation operation at any time after the esterification. It is therefore an immense advantage of this invention that this process can be applied to most production processes without major process modifications. Even an addition to the late conversions or even in the vacuum phase is therefore possible because of the very high boiling points of the respective additives.

In contrast to the teaching of DE 4 111 066 A, the process of the invention therefore has the advantage that the polycondensation operation does not have to be stopped by interrupting the vacuum phase and delayed for a necessary reaction time.

Moreover, the operation is not restricted to continuous systems. It has been determined, for instance, that the additive can be added to a batch operation without interruption of the vacuum phase. Furthermore, the operation according to the invention has the advantage that the additives can be introduced in pure form without solvent such as for example ethylene glycol, i.e., any degradation of the synthesized polyester due to additional glycol added is circumvented. Also, the tetrahydrofurfuryl alcohol formed during the branching reaction can be termed low boiling in that its boiling point is 178° C., and is simple to remove from the reaction medium during the polycondensation phase with the glycol formed. Besides, tetrahydrofurfuryl alcohol is not toxic.

It has been determined that, surprisingly, the branching efficiency or density is distinctly higher when the additive according to the invention is used than when corresponding compounds such as for example tetraethoxysilane are used.

The fibers obtained have molecular weights in the range from 18 000 g/mol to 30 000 g/mol after dyeing and hence are suitable for producing low pill fabrics. Furthermore, the textile fabrics have a soft hand, a low tendency to wrinkle and tend to an increased and faster dye uptake compared with the correspondingly unmodified materials.

The polycondensate obtained according to the invention by use of a silicic ester of furfuryl alcohol is processed into fibers in a conventional manner by melt spinning. The fibers can be crimped, set and cut. The fibers can be processed into textile products such as textile sheet materials in a conventional manner. However, it is essential for the purposes of this invention that the fibers be treated with the water-containing medium at any time after spinning, for the purpose of hydrolysis. The water-containing medium may be an aqueous preparation, but a treatment with water or water vapor itself is possible as well. The treatment is preferably carried out on the fibers after they have already been processed into a textile product.

The preferred treatments with an aqueous medium include dyeing, but also steaming and setting with water vapor. The temperatures for the treatment and the treatment time have to be determined such that the temporary branching are broken down at sufficient sites. Treatments at temperatures of 80–150° C., perhaps under superatmospheric pressure, are particularly suitable for this purpose. Treatments in the acidic pH range are advantageous.

The treatment with an aqueous medium can also be accomplished by applying an aqueous spin or other finish to the fibers and then treating the fibers at an appropriate temperature, so that the water still present can act hydrolytically and break down the temporary branchings to the desired degree.

The low pill polyester fibers produced as per the process according to the invention have good mechanical properties after treatment with water and yet possess a reduced tendency to pill.

It is particularly advantageous that the fibers obtained do not have to be subjected during the actual fiber production operation, for example by treatment in a waterbath or targeted exposure to a moist atmosphere, to develop their low pill properties. It is completely sufficient for the fibers to be given such a treatment only in the course of further processing stages in which the fibers come into contact with an aqueous medium. It is thus possible for the properties to be induced without further ado in the course of a dyeing in an aqueous liquor or in the course of treatment of the ready-produced textile in for example saturated steam.

The pilling performance of textile sheet materials is carried out according to the Random Tumble Pilling Test (RTPT) in accordance with DIN 53867. The surface state is rated after 5, 10, 20, 30, 40 and 60 minutes against the 9-point pilling ordinal scale (POS) where 9 is the best score, denoting unpilled, and 1 is the worst score, denoting badly pilled.

It has been determined that textile sheet materials which have been produced using the fibers produced according to the invention give good to very good pilling scores. The scores are in the range of 7–9.

Another way of testing the pilling performance of low pill fibers is to subject the fibers to a flex abrasion test. It has been determined that there is a correlation between the flex abrasion resistance values obtained and the pilling resistance. Fibers which on average break after 100–300 double strokes in the flex abrasion test exhibit good pilling resistance in a woven fabric.

Fibers produced according to the invention break on average after 300 double strokes or fewer in a flex abrasion test after the hydrolytic treatment.

Indications that the flex abrasion resistance be investigated as a measure of pilling performance are discernible inter alia from the book by Fourne "Synthetische Fasern" Carl Hanser Verlag Munich Vienna 1995, page 781.

Flex abrasion resistance may be measured for example by the following method:

Individual fibers are flexed across a steel wire at an angle of 110° at a frequency of 126 double strokes/min. A fixed pre-tensioning force of 0.45 cN/dtex ensures that a defined abrasive action acts on the fiber. The diameter of the steel wire used depends on the fiber's linear density and increases with coarser fibers. The number of double strokes to break is determined on 50 fibers. The mean value from these 50 tests permits influences about the stressability at right angles to the fiber axis and thus gives an indication of the tendency of the tested fibers to pill.

The examples which follow illustrate the invention:

EXAMPLE 1

The slurrier in a 150 kg batch reactor battery is filled with 86.5 kg of PTA, 34.9 l of ethylene glycol and 10 ml of choline (10% solution in methanol) and stirred at 60° C. for half an hour. The slurry is then transferred into the esterifier and esterified at 2.8 bar gauge pressure. The internal temperature of the prepolymer is allowed to rise to 265° C. in the course of the esterification, the water of reaction formed being removed via a column. In the event that the column head temperature decreases the reactor pressure is lowered to atmospheric, and remaining water of reaction and excess glycol passes over. The internal temperature is raised to 280° C. in the process.

The prepolymer subsequently has 43 g of Hordaphos PHM added to it and is stirred for 5 minutes. Then 1 600 g of a 1.25% antimony glycolate solution in glycol are added and allowed to stir in for one minute. Prior to the melt being forced over, 180 g of a 10% $TiO_2$ suspension in EG are added and allowed to stir in for one minute.

During the passing over of the prepolymer, the low viscosity melt is filtered and the pressure in the polycondenser is lowered to 1 mbar in stages. When the molecular weight $M_w$=17 100 g/mol, the melt has 830 g of tetrakistetrahydrofurfuryloxysilane added to it via a pressure lock. During the addition (duration about 1 minute) the pressure in the reactor is raised to about 100 mbar with the aid of $N_2$ and then brought back down to about 1 mbar. When the molecular weight is about $M_w$=36 500 g/mol, the reactor is purged with $N_2$ and the polymer is extruded by means of heated die plates in coarse strands via cooling baths and pelletized.

The pellet thus produced is introduced into a tumble dryer and dried for 10 hours. During this period, pellet temperature is initially raised continuously from 50° C. to 90° C. over 4 hours and then to 190° C. over 6 hours. The modified PET is spun at a melt temperature of 293° C. in an art-conventional melt-spinning apparatus comprising a spinneret die having 540 holes 0.4 mm in diameter drilled through it. The melt throughput through the die is 526 g/min. The filaments emerging from the die are provided at right angles with hot air at 40° C. and at the lower end of the spinning chimney with a spin finish. The spinline thread is wound up at a speed of 1 300 m/min.

The spinline threads thus obtained are converged into 58.3 ktex tow which is continuously fed into an aqueous spin finish bath solution at 55° C.

The tow is subsequently drawn to a draw ratio of 4.3 at 76° C., crimped in a crimping machine and set tensionlessly in an oven at 120° C. for about 11 minutes. The tow is cut into fibers having an average staple length of 38 mm.

The staple fibers obtained have the following properties:

| | |
|---|---|
| Linear density of individual fiber: | 1.9 dtex |
| Tenacity: | 32.6 cN/tex |
| Elongation at break: | 34.3% |
| 200° C. hot air shrinkage: | 9.9% |
| Flex abrasion cycles: | 820 double strokes | after 60 minute pack dyeing at 130° C.: flex abrasion cycles: 240 double strokes The molecular weight after dyeing is determined as $M_w$=22 700 g/mol.

EXAMPLE 2

The slurrier in a 150 kg batch reactor battery is filled with 86.5 kg of PTA, 34.9 l of glycol and stirred at 60° C. for half an hour. The slurry is subsequently transferred into the esterifier 197 g of a 3% potassium titanyl oxalate solution are added and esterified at 2.8 bar gauge pressure. The rest of the procedure is as indicated under example 1. When the molecular weight $M_w$=8 700 g/mol, the melt has 870 g of tetrakistetrahydrofurfuryloxysilane added to it via a pressure lock. When the molecular weight is about $M_w$=34 700 g/mol, the reactor is purged with $N_2$ and the polymer pelletized.

The pellet thus obtained is processed as described in example A to obtain staple fibers having the following properties:

| | |
|---|---|
| Linear density of individual fiber: | 2.0 dtex |
| Tenacity: | 31.3 cN/tex |
| Elongation at break: | 27.6% |
| 200° C. hot air shrinkage: | 4.8% |
| Flex abrasion cycles: | 805 double strokes | after 60 minute pack dyeing at 130° C.: flex abrasion cycles: 280 double strokes The molecular weight after dyeing is determined as $M_w=25\,000$ g/mol.

The invention claimed is:

1. A process for producing low pill polyester fibers by transesterifying of at least one dialkyl dicarboxylate or esterifying of at least one dicarboxylic acid with at least one diol and subsequent precondensing and polycondensing in the presence of a catalyst and using organosilicon compound, comprising at least one substituent of the formula:

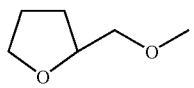

on the silicon and processing the polycondensate obtained into fibers.

2. A process according to claim 1, wherein the organosilicon compound used is tetrakistetrahydrofurfuryloxysilane.

3. A process according to claim 1, wherein the organosilicon compound used is tristetrahydrofurfaryloxymethylsilane.

4. A process according to claim 1 wherein the process is operated continuously.

5. A process according to claim 1, wherein the process is operated batchwise.

6. A process according to claim 1, wherein the organosilicon compound is used in an amount of 100–2000 ppm, reckoned as silicone and based on weight reaction mixture.

7. A process according to claim 1, wherein the organosilicon compound is added after transesterification of dialkyl carboxylate with at least one diol.

8. A process according to claim 1 wherein the alkyl dicarboxylate used is dimethyl terephthalate.

9. A process according to claim 1, wherein the organosilicon compound is added at a time when the polycondensate has a molecular weight $M_w$ of 3000–20000 g/mol.

10. A process according to claim 1, wherein the organosilicon compound is added at a time when the pressure of the polycondensation is 0.5 mbar –1.5 bar.

11. A process according to claim 1, wherein the organosilicon compound is added to the polycondensation melt at a time when the carboxyl group content of the polycondensate is less than 35 mmol/kg.

12. The process of claim 1, wherein the fiber is treated with an aqueous medium.

13. A process according to claim 12, wherein the treatment with the aqueous medium is carried out at temperatures of 80–150° C.

14. Low pill polyester fibers obtained by a process of claim 1.

* * * * *

UNITED STATES PATENT AND TRADEMARK OFFICE
CERTIFICATE OF CORRECTION

| | | |
|---|---|---|
| PATENT NO. | : 7,189,794 B2 | Page 1 of 1 |
| APPLICATION NO. | : 10/481394 | |
| DATED | : March 13, 2007 | |
| INVENTOR(S) | : Andreas Maurer, Markus Höhenberger and Roland Schreiner | |

It is certified that error appears in the above-identified patent and that said Letters Patent is hereby corrected as shown below:

<u>Column 9</u>

Line 22, delete "tristetrahydrofuraryloxymethylsilane" and insert --tristetrahydrofurfuryloxymethylsilane--.

Signed and Sealed this

Third Day of July, 2007

JON W. DUDAS
*Director of the United States Patent and Trademark Office*